United States Patent [19]

Hintz et al.

[11] E Re. 29,272

[45] Reissued June 21, 1977

[54] WATER RESISTANT CORRUGATED PAPERBOARD

[75] Inventors: Harold L. Hintz; Joseph T. Webb, both of Charleston, S.C.

[73] Assignee: Westvaco Corporation, New York, N.Y.

[22] Filed: June 7, 1976

[21] Appl. No.: 694,046

Related U.S. Patent Documents

Reissue of:

[64] Patent No.: 3,849,224
Issued: Nov. 19, 1974
Appl. No.: 273,835
Filed: July 21, 1972

[52] U.S. Cl. ..... 156/208; 156/210; 427/326; 427/411; 428/182

[51] Int. Cl.[2] ..... B31F 1/22

[58] Field of Search ..... 156/205, 208, 210; 106/238; 162/164; 428/179, 182, 184, 186, 171; 427/326, 411

[56] References Cited

UNITED STATES PATENTS

| | | | |
|---|---|---|---|
| 3,189,502 | 6/1965 | Little | 156/210 |
| 3,308,006 | 3/1967 | Kresse et al. | 156/210 |
| 3,409,500 | 11/1968 | Strazdins et al. | 162/164 |
| 3,445,330 | 5/1969 | Kulick et al. | 162/164 |
| 3,676,247 | 7/1972 | Morris et al. | 156/210 |

FOREIGN PATENTS OR APPLICATIONS

| | | |
|---|---|---|
| 879,643 | 8/1971 | Canada |

OTHER PUBLICATIONS

Casey, Pulp and Paper, Second Ed., 1960, pp. 1052–1057.

*Primary Examiner*—David A. Simmons

[57] ABSTRACT

A water resistant corrugated paperboard material is prepared wherein the paperboard components (medium and liner or liners) are each coated on both sides with a thermoplastic film which acts as a water barrier and a water resistant adhesive for bonding the components together. The corrugated medium is also pretreated with an internal size treatment to prevent edge wicking, and, for the purpose of corrugating the medium without deleteriously affecting the thermoplastic film, the corrugating rolls are preheated to a temperature slightly less than the melting point of the thermoplastic film while a lubricating material is simultaneously applied to either the corrugating rolls or the medium at the corrugating nip.

10 Claims, 3 Drawing Figures

WATER RESISTANT CORRUGATED PAPERBOARD

Matter enclosed in heavy brackets [ ] appears in the original patent but forms no part of this reissue specification; matter printed in italics indicates the additions made by reissue.

SUMMARY OF INVENTION

The present invention relates generally to an improvement in corrugated paperboard and specifically to a water resistant corrugated paperboard packaging material and method for producing the packaging material.

Corrugated paperboard is widely used in the packaging industry where substantial container strength and an economical construction is desired. However, the water absorption and moisture penetration characteristics of conventionally manufactured corrugated paperboard have made it unusable for containers which are subjected to either high humidity or direct water cooling and/or ice containing conditions. For instance, although some attempts have been made to use conventional corrugated paperboard as the material of construction for iced containers, which use ice as a refrigerant, the water produced by the melting ice soaks into the paperboard so rapidly and produces such a weakening effect on the containers, that complete collapse of the containers frequently occurs before the product reaches its destination. Similarly containers which are subjected to hydrocooling conditions, where water is sprayed directly onto the container to maintain the freshness of the product packaged therein, also suffer deleteriously from the effects of water penetration and absorption. In addition, shipment and storage conditions frequently subject corrugated paperboard containers to high humidity conditions or even exposure to rain or to snow, over extended periods of time. Under such conditions, even if the container does not weaken to the point of collapse, it is still ineffective to protect the contents of the container from the penetration of moisture through the walls of the container.

In an effort to overcome the susceptibility of corrugated paperboard containers to structural weakening and failure upon contact with water or water vapor, it has previously been suggested to coat the paperboard liners or medium, or both, with a water resistant sizing or coating material. Other suggestions have been directed toward the application of a thermoplastic film to one or both of the paperboard liners or medium especially as taught by Canadian Pat. No. 879,643. Unfortunately, none of these previously offered solutions serve to produce a completely satisfactory product. In the case of the water resistant sizing or coating technique, the problems encountered have included both an unsatisfactory penetration of the water proof material into the paperboard itself, or, a cracking of the water resistant film when the paperboard blanks are folded and set-up. With respect to the thermoplastic film laminated products, the high cost of production and the difficulty in corrugating the thermoplastic coated medium, or in obtaining a good bond between the thermoplastic coated medium and/or the liner or liners on the machine, except at slow speeds, have been the detrimental factors. In addition, no satisfactory means has yet been developed for preventing moisture from wicking into the edges of thermoplastic coated paperboard material and producing a devastating weakening effect to the otherwise strong material.

However, by the present invention, each of the limitations and disadvantages of the prior art methods have been overcome by providing an improved corrugated paperboard and method of manufacturing corrugated paperboard to achieve a water resistant corrugated paperboard having superior WVTR (water vapor transmission rate) properties, excellent rigid when wet characteristics, and good runnability on the machine. Broadly stated, the present invention comprises a method of constructing an improved water resistant corrugated paperboard, which method employs a thermoplastic coating on both sides of the corrugated medium and the liner or liners. Accordingly, the thermoplastic coating serves as both the water barrier and the water resistant adhesive for bonding the corrugated paperboard together. In addition, the present invention also contemplates the use of a novel size treatment for the corrugated medium to inhibit any wicking of water from the edges through the coated medium. And finally, the invention further incorporates a combined heating and lubricating step at the corrugator to insure proper corrugation of the thermoplastic coated medium without cracking or, otherwise deleteriously affecting the thermoplastic coating.

In an illustrative embodiment, the product produced by the present invention may be described more specifically as a water resistant rigid when wet corrugated paperboard material wherein the paperboard components (medium and liner or liners) are each coated on both sides with a thermoplastic polyolefin such as polyethlene. The polyolefin coating on both sides of the medium and liner board is preferably in the range of 0.75 – 1.0 mil thick, or even thicker, and serves as a water barrier and as a water-resistant adhesive for bonding the components together. The corrugated paperboard product is produced on conventional corrugating equipment, except that in the process of the present invention, wicking of water or other moisture from the edges through the linerboard and medium is controlled by a special synthetic or rosin sizing treatment to both the linerboard and the medium. In addition, for the purpose of carrying out the process of the invention, i.e., the making of the novel water resistant corrugated paperboard product described herein, the corrugating rolls on the corrugating machine are preferably heated to a temperature slightly below the melting point of the polyolefin coating while simultaneously a lubricating material is applied to either the surface of the corrugating rolls, or to both sides of the medium at the entrance to the corrugating nip. When polyethylene is used as the preferred polyolefin, the corrugating rolls are preferably heated to a temperature of between 150°–215° F., and the preferred lubricating material consists of either a fine plain water spray or a water spray containing a mild detergent.

Thus it may be stated that the novelty in the present invention as regards the product produced lies in the use of a thermoplastic polyolefin coating of at least 0.75 mil thick on both sides of both the medium and the linerboard, in combination with a size treatment to the corrugating medium consisting of by weight either at least 0.2% synthetic size, in the form of a stearic anhydride or succinic anhydride emulsion with 0.3 – 0.4% alum, or 0.75 – 1.0% rosin size with up to 1.5% alum. Since corrugating medium is normally unsized, to enable the medium to pick up the usual starch adhesive when forming conventional corrugated paperboard, the mere fact of applying a size treatment to the corrugating medium itself, according to the present invention, represents a departure from the conventional manufacture of corrugated paperboard. Moreover, the preferred sizing applied to the medium according to the present invention is of a higher level than is normally used even on linerboard. Conventionally, linerboard is internally sized with a rosin/alum system containing up to 0.5% rosin. Accordingly, the sizing treatment of the present invention serves to contribute to the surprising results obtained with the corrugated paperboard produced, particularly as regards strength retention after a 24 hour water soak test, since the sizing treatment prevents water from wicking through the unprotected edges of the corrugated medium and linerboard, and through holes or cracks that might develop in the polyolefin film coating. In addition, the considerable increase in the waterproofness of the corrugated paperboard produced herein may be attributed to the thickness of the polyolefin film applied which serves to control the overall WVTR of the board. Moreover, since the crush strength of corrugated paperboard is greatly reduced by moisture absorption, the thickness of the polyolefin film is very significant with respect to the ultimate strength of the board after soaking.

With respect to the process for producing the improved water resistant corrugated paperboard according to the present invention, it was discovered that a sheet of sized, polyolefin coated corrugating medium, with a film thickness in excess of 0.75 mil on each side, could not be readily corrugated on conventional equipment without the addition of two significant steps. First, it was found that flutes could not be formed in the film coated medium without heating the medium to a temperature slightly less than the melting temperature of the film. This was accomplished by directly heating one surface of the medium and indirectly heating the other surface of the medium by applying heat to one of the corrugating rolls. Secondly, it was found that even with the heated medium, cracks still tended to develop in the film until a lubricating material was applied to the medium at the corrugating nip. Thus it is believed that the novel steps introduced into the art by the present invention, as regards the process described, constitute the limitations whereby the film coated corrugating medium is heated to a temperature to render the thermoplastic film soft, and, a fine spray of lubricating water is applied to the film coated medium or to the corrugating rolls themselves at the nip of the corrugating rolls.

For the purpose of bonding the polyolefin coated medium and linerboards, it was only necessary to apply sufficient heat to one or both of the polyolefin films to render the surface thereof tacky just prior to the bonding nips. In this manner, the components were heat sealed to one another to form the almost completely water resistant paperboard material disclosed herein.

DETAILED DESCRIPTION

Figure 1:
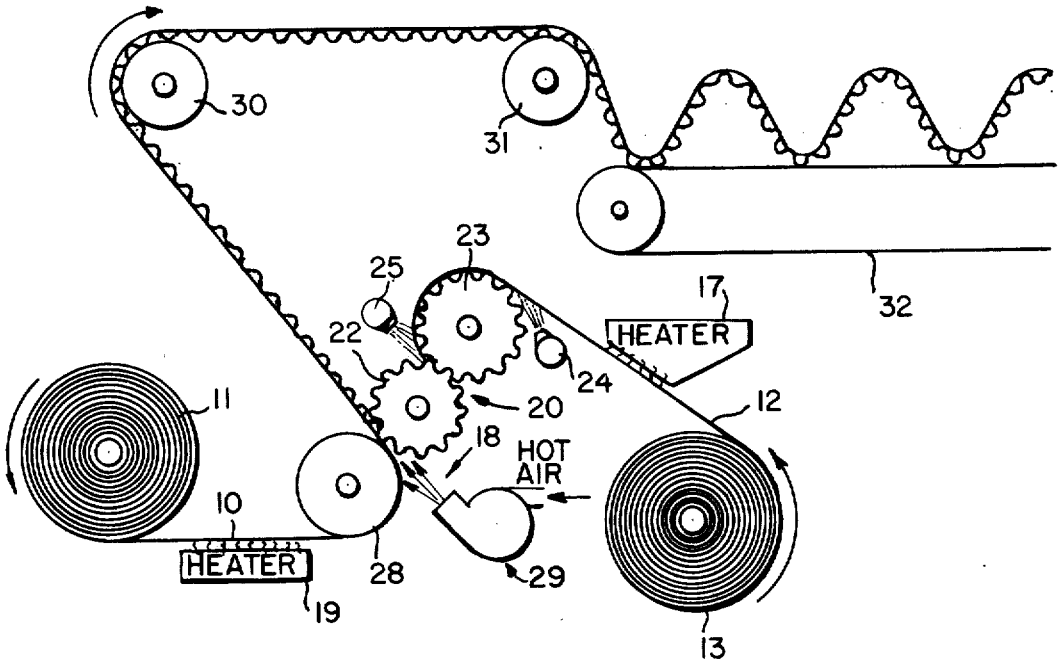
FIG. 1 shows schematically the method of manufacturing single face paperboard according to the present invention.

The present invention is directed to an improved water resistant corrugated paperboard material manufactured in a heat sealing operation from thermoplastic coated paperboard components wherein the thermoplastic coating is preferably a thermoplastic polyolefin material having a film thickness on the order of from 0.75 – 1.0 mil thick. The linerboard component used, in addition to being precoated both sides with a polyolefin such as polyethylene, is of conventional linerboard material. However, the corrugating medium preferred is non-conventional in that prior to coating the corrugating medium on both sides with a polyolefin film such as polyethylene, the paperboard material from which the corrugating medium is made is specially treated with a size treatment comprised of either at least a 0.2% synthetic size, in the form of a stearic anhydride or succinic anhydride emulsion in the presence of from 0.3 – 0.4% alum, or a rosin size of from 0.75 – 1.0% rosin in the presence of about 1.5% alum. In addition, the thickness of the polyethylene film coating preferred is at least 0.75 mil or thicker, thus yielding a water resistant corrugated paperboard material having excellent rigid when wet characteristics. The polyethylene film is preferably extruded simultaneously on both sides of the medium (before corrugating) and the linerboard material in a single pass through an extruder, although two passes coating one side at a time could be used. The polyethylene film on both sides of the medium and the linerboard material serves as an excellent water barrier giving good WVTR properties to the components, and as a water resistant adhesive for bonding the component elements of the corrugated paperboard together. The synthetic or rosin size treatment to the corrugating medium further serves to insure a high retention of strength to the corrugated paperboard by preventing wicking of water into the medium from the edges of the paperboard, or moisture penetration through the linerboards into the medium under severe humidity or water soak conditions. Furthermore, even though the rosin size treatment is considered the preferred treatment, it is believed that other sizing materials such as asphaltic emulsions, alkylketenedimers, waxes and fatty acids could be used with similar success.

The invention is also directed to a novel method of manufacturing water resistant corrugated paperboard wherein the paperboard components consist of one or more linerboard members and at least one corrugated medium, each of which is coated on both sides with a polyolefin film such as polyethylene. The method of manufacture for a single facer operation comprises the preliminary step of applying to both sides of a linerboard component and a sized corrugating medium component a thermoplastic film of polyethylene or the like having a thickness in excess of 0.75 mil. The polyethylene coated corrugating medium is then conducted to a corrugating section of a conventional corrugating machine where the pre-coated medium is preferably slightly pre-heated and passed over a heated corrugator roll and into contact with another heated corrugator roll, in the presence of a lubricating water spray shower at the nip of the corrugator rolls, to form corrugations in the medium without cracking or otherwise deleteriously affecting the polyethylene film on the medium. Subsequently, the corrugated medium and the single face linerboard are adhered to one another by applying to either the linerboard or corrugated medium, at the bonding surface, a direct heating treatment to render the surface of one or both of the components tacky or slightly melted. At the same time, both the corrugated medium and the single face linerboard are applied with an indirect heat treatment, through one of the corrugating rolls and through the pressure roll, respectively, to assist in the bonding operation. The heat applied indirectly to the linerboard and the corrugated medium, through the pressure roll and the corrugating roll respectively, is critical since too much heat causes the coated linerboard or medium to adhere to the pressure roll or corrugating roll and too little heat tends to conduct the required heat for bonding away from the bonding nip.

Similarly, for a double facer operation, the single face board taken from the above described operation would be bonded to another polyethylene coated linerboard component in substantially the same way. For example, the single face corrugated board taken from the previous operation would be applied with a direct heat source on its fluted surface and the second polyethylene coated linerboard would be directly heated as before to a temperature slightly less than the melting point of the polyethylene (less than 200° F.) to render the surfaces tacky and bondable. Finally, in the presence of an additional direct heating source at the double face combiner station, the single face corrugated board and the double face linerboard would be bonded together and then passed between a series of cold plates or belts to allow the different components to be completely bonded into the water resistant corrugated paperboard material described herein.

Referring now more particularly to FIG. 1 of the drawing herein, a schematic illustration of the preferred means for manufacturing single face corrugated paperboard according to the present invention is shown in FIG. 1, a web 10 of linerboard is shown as being unwound from a roll 11. The linerboard material 10 as previously described is of a conventional type, except that for the purposes of the present invention, both sides thereof have been previously coated with a film of a thermoplastic polyolefin material such as polyethylene. As stated hereinbefore, the thickness of the film of polyethylene is preferably at least 0.75 mil, but may be between 1.0 – 5.0 mils in thickness depending upon the type of duty intended for the final product.

After being unwound from the roll 11, the coated linerboard web 10 is then given a pre-heat treatment by the heater 19 prior to being conducted to the pressure roll 28 as shown. The pre-heat treatment at 19 is intended only to condition and instigate a slight softening of the outside film of polyethylene on the linerboard web 10 prior to entering the bonding nip at 18. Accordingly the temperature at the pre-heater 19 is only on the order of 200° F. for a typical polyethylene coating.

Meanwhile, still referring to FIG. 1, there is also illustrated a roll 13 of corrugating medium 12 which, as previously pointed out, is decidedly unconventional. For the purposes of the present invention, the corrugating medium 12, in addition to being pre-coated both sides with a film of polyethylene or the like, as in the case of the linerboard just described, also includes another special treatment to render it not susceptible to the edge wicking of moisture in any form. Namely, the corrugating medium 12 includes a size treatment which may comprise either at least a 0.2% synthetic size in the form of a stearic anhydride or succinic anhydride emulsion with from 0.3 – 0.4% alum, or a rosin size of from 0.75 – 1.0% rosin in the presence of about 1.5% alum. The preferred size treatment comprises a wet end internal treatment, although it is believed that a surface size or gate roll size treatment would achieve similar results providing the latter two treatments were able to obtain good penetration of the size material into the medium. Accordingly, in view of the fact that conventional corrugating medium is normally unsized, *the* treatment described is believed to be one of the key factors in the surprising success of the present invention as will be further illustrated later on.

However, for the purpose of carrying out the present invention, the size treated and pre-coated medium component 12 is conducted to the corrugating section 20 of the corrugating machine in a substantially conventional manner except that, prior to reaching the corrugating roll 23, the outside surface of the polyethylene coated medium 12 is given a direct pre-heat treatment by the pre-heater 17. In the case of a polyethylene coated medium 12, the pre-heater 17 would be set at a temperature of around 200° F. since its purpose is only to slightly soften the outside film surface of the medium 12 preparatory to entering the corrugating nip 20. If other thermoplastic coatings were used on the medium 12, the temperature of the pre-heater 17 would be adjusted accordingly.

At the corrugating section 20, the medium 12 is passed around a heated corrugating roll 23 and then between the roll 23 and another heated corrugating roll 22. Each of these rolls 22, 23 are preferably internally heated to a temperature slightly less than the melting point of the polyethylene film, or in the range of from 150° – 200° F., depending upon the speed of operation. The temperature applied internally through the corrugating rolls 22, 23 is critical as pointed out hereinbefore since it must be high enough to permit the coated medium 12 to be corrugated yet low enough to prevent the coating from sticking to the corrugating rolls. Thus it may be seen that both surfaces of the pre-coated medium are heated, by the pre-heater 17 and the corrugating roll 23, prior to entering the corrugating nip 20 to render the medium 12 pliable and susceptible to being corrugated without cracking or otherwise deleteriously affecting the thermoplastic coating.

However, as pointed out hereinbefore, the fact that the medium is heated before corrugating is not a sufficient preparation for successfully corrugating a pre-coated medium having either a high coat weight (i.e., a thick coating in excess of 0.75 – 1.0 mil), or at a high speed. Accordingly, a pair of lubricating sprays 24, 25 are added to the corrugating section [on] 20 to either spray both sides of the medium 12 before entering [79] the corrugating nip 20, or to spray directly onto the corrugating rolls 22, 23.

FIG. 1 illustrates a spray nozzle 24 adjusted to lubricate either the inside surface of the medium 12 or directly onto the roll 23. Similarly, a spray nozzle 25 is also shown in FIG. 1 which lubricates the outside surface of the medium 12 or the roll 22. In this manner, the heated corrugating rolls 22, 23 allow the medium to be bent in forming the flutes and the lubricant, in the form of either a fine mist of plain or detergent containing water, acts as a means for reducing friction as the coated medium 12 is forced between the corrugating rolls 22, 23. It should further be appreciated that only a schematic view of the invention is illustrated, and for a full scale model a shower pipe or a plurality of nozzles would be needed throughout the width of the corrugating section 20.

After passing between the nip of the corrugating rolls 22, 23, the now corrugated medium 12 is shown as being bonded to the single face linerboard 10 at the combining station 18. To accomplish this step, the bonding surface of the linerboard 10, as previously stated, is preheated at 19 to a temperature of about 200° F., and brought into nip engagement with the indirectly heated corrugated medium 12 between the internally heated (150° – 200° F.) pressure roll 28 and the corrugating roll 22. Again, as pointed out hereinbefore, the temperature of the pressure roll 28 must not be too high or the coated linerboard will tend to adhere to the roll. Moreover, the temperature of the pressure roll 28 cannot be too low or the heat necessary for bonding will be conducted away from the bonding nip. To assist in the bond and insure that the proper surface of the corrugated medium becomes tacky, additional direct heat is applied to the bonding surface of the medium 12 and/or the linerboard 10 by the heating means 29. For the purposes of the present invention, it has been found that a hot, air burner having a capacity of at least [ 5000,000 ] *500,000* Btu/hr. connected to a large blower, is sufficient to produce a hot air stream on the order of 450° F. and thus insure a good bond between the medium and the linerboard at respectable machine speeds (in excess of 150 ft./min.) After the combiner station, the now single face corrugated paperboard is passed around a first guide roller 30 and over a second guide roller 31 and onto an endless conveyor 32 upon which the single face board is accumulated for the purpose of cooling the board and allowing the bond to become completely set.

Figure 2:
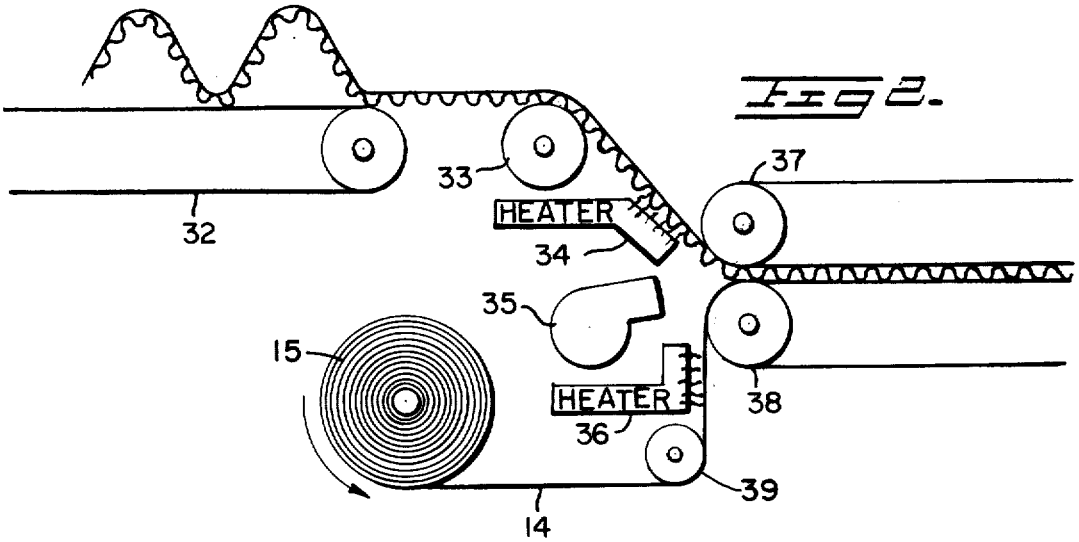
FIG. 2 shows schematically the method of manufacturing double face paperboard according to the present invention; and, FIG. 3 is a view in cross-section of the water resistant corrugated paperboard produced according to the present invention.
Figure 3:
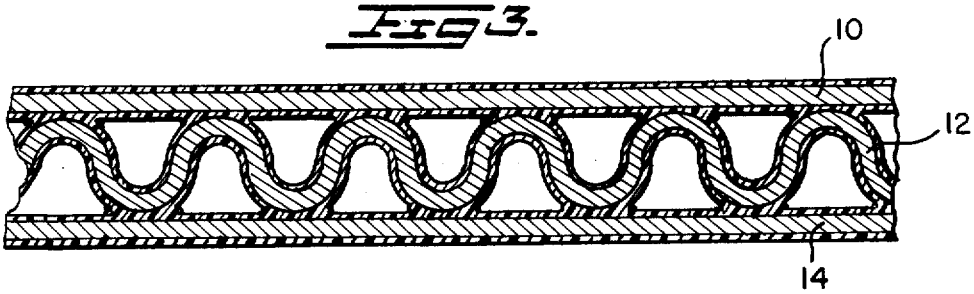

FIG. 2 illustrates a preferred method for making double face corrugated paperboard from the single face board obtained from FIG. 1. In this view, the single face board accumulated on the endless conveyor 32 is conveyed over a guide roller 33 past a preheat station 34 and into a nip created between the cold plates or belts at 37, 38. Meanwhile, the linerboard 14 is stored on a roll 15 and as before, with the linerboard 10, has coated on both sides thereof a film of a thermoplastic material such as polyethylene. The linerboard 14 is accordingly passed around a guide roller 39 and past a pre-heat station 36 and into the nip at 37, 38. At each pre-heat station 34, 36, the bonding surfaces of the fluted medium 12 and the linerboard 14 are each preheated to about 200° F where polyethylene film is used, and for the purpose of rendering the surfaces tacky or melted enough to become bonded, a second heating means 35 is arranged to provide direct heating treatments in excess of 450° F to the fluted medium and/or liner thereby *insuring* a good bond. Finally, the double face corrugated paperboard is then permitted to cool between the cooling plates or belts 37, 38 until the bond sets.

In order to demonstrate the surprising results obtained as regards the wet strength retention of the corrugated paperboard produced in accordance with the present invention, tests were conducted wherein boxes were constructed from different kinds of corrugated paperboard and subjected to top-to-bottom compression strength and 24 hours water soak strength retention measurements. For the purpose of comparison, the boxes were constructed from a conventional, non-treated corrugated paperboard referred to as "Domestic," a cascade wax treated corrugated paperboard wherein the box blanks were coated with wax on each side in a curtain coater, and referred to as "Cascade Waxed;" a wax-impregnated curtain coated corrugated paperboard product called "Cote-A-Cor 600;" and, the polyethylene coated product of the present invention referred to as "Polyboard." The "Polyboard" sample had a 0.75 – 1.0 mil thick film of polyethylene applied to each side of each component. In each case, the basis weight of the different paperboard components and the corrugated paperboard constructions were substantially the same except that for the Cote-A-Cor 600 box and the Cascade Waxed box, the fluted medium was C-flute and for the other examples, the fluted medium was A-flute. For the purpose of explanation, the number of flutes per linear foot is greatest with C-flute, and the height of the flutes between the two facings is greatest with A-flute. Therefore, it might be expected that C-flute corrugated paperboard would be somewhat stronger than A-flute corrugated paperboard. Some of the sample boxes were tested for their top-to-bottom compression strength under standard atmospheric conditions, and other samples were subjected to a 24 hour water soak condition and then tested for top-to-bottom compression. Based on the test described, the following data was obtained.

TABLE I

Top-to-Bottom Compression Strength and % Strength Retention

| Paperboard Grade | Std. Cond. (lbs.) | 24 Hour Soak (lbs.) | Strength Ret. % |
|---|---|---|---|
| Polyboard | 596 | 483 | 81.0 |
| Cascade Waxed | 713 | 91 | 12.8 |
| Cote-A-Cor 600 | 872 | 82 | 9.4 |
| Domestic | 578 | Delaminated | — |

For the samples tested, the load the boxes were able to withstand under standard conditions varied depending upon the kind of fluted medium used as explained before. However, the amount of strength retained by each box after the 24 hour water soak treatment was directly related to the water absorption characteristics of the paperboard material used. In the case of the box constructed from Domestic [paperboards] *paperboard,* water absorption was immediately observed when the box was submerged in the water tank and delamination occurred. For the box constructed from Cote-A-Cor 600 and the Cascade Waxed box, the water absorption was not immediate upon dunking, but the wicking of the fluted medium plus the moisture absorbed through the linerboard to the fluted medium in each case was severe enough to permit internal collapse of the paperboard material when load was applied after the 24 hour soak. In the case of the Polyboard boxes, the water absorption was very low, and significantly, there was practically no visible wicking of the size treated corrugated medium compared with the other boxes, the loss in strength of the Polyboard box after soaking was only slight, as noted in the data, and the loss that did occur was directly related to fine cracks or pin holes in the polyethylene coating applied to the components.

In order to further demonstrate the dramatic retention of wet strength achieved by applying a size treatment to the conventionally unsized corrugated medium a second test was conducted wherein corrugated paperboard samples were prepared using various types of medium. As before, conventionally sized linerboard was used, coated on both sides with a 0.75 – 1.0 mil thick film of polyethylene, and this linerboard was bonded to different examples of corrugated medium also coated on both sides with a 0.75 – 1.0 mil thick film of polyethylene. The different corrugated mediums chosen were a typical unsized medium, a medium sized with rosin in the preferred manner set forth herein (0.75 – 1.0% rosin with 1.5% alum), a medium sized with a wet strength resin (urea formaldehyde), and a medium fabricated from conventional linerboard material. The results of the test are shown below and illustrate the surprising wet strength retention that could be expected by sizing the corrugating medium in accordance with the present invention.

TABLE II

Top-to-Bottom Compression Strength and % Strength Retention

| Paperboard Grade | Std. Cond. (lbs.) | 24 hr. Soak (lbs.) | Water Abs. % | Strength Ret. % |
|---|---|---|---|---|
| Polyboard (unsized med.) | 594 | 141 | 55.4 | 23.7 |
| Polyboard (w/s med.) | 620 | 186 | 62.2 | 30.0 |
| Polyboard (linerboard med.) | 550 | 174 | 19.2 | 31.6 |
| Polyboard (sized med.) | 540 | 397 | 18.5 | 73.5 |

Thus it may be seen from the results set forth above that when a regular (unsized) corrugated medium was used, the compression strength after soaking for 24 hours was only [2.37] *23.7%* of its original value. The addition of a wet strength resin to the medium raised the strength retention only to 30%, and, even with conventionally sized linerboard as the medium, the wet strength retention amounted only to 31.6%. Since linerboard is conventionally sized, it could have been expected that with the linerboard as the medium, the strength retention would have been higher. Later observations found that the Polyboard constructed using linerboard as the corrugated medium were not properly coated in the polyethylene extruder. Hence, this problem was believed to be a contributing factor in the low strength retention found with the linerboard corrugated medium. However, the only dramatic increase in wet strength retention was obtained when the corrugated medium was treated according to the present invention.

Other experiments illustrated that polyethylene was not the only material that could be used to coat the paperboard components. When linerboard and corrugating medium having a hot melt adhesive coating were tested, the moisture absorption and strength retention of these elements were found to be similar to the preferred Polyboard product described herein.

In addition, the use of a hot melt adhesive to coat the paperboard components would offer an excellent means for squaring and bonding the manufacturers joint of carton blanks made from the corrugated paperboard disclosed. Other methods of joining the carton blanks made from the water resistant paperboard of the present invention would consist of stitching, the use of cold setting adhesives, or a simple heat seal treatment. Finally, because of the superior wet strength retention and improved dry strength of the thermoplastic coated paperboard described herein, it is conceivable that the paperboard components used could be of a lower basis weight material than that normally required for a given purpose. Thus, cost savings in raw material could be achieved with the novel corrugated paperboard material described herein.

It may be seen that the water resistant corrugated paperboard described herein is capable of obtaining and retaining excellent rigid when wet strength characteristics heretofore unattainable by any competitive product. In fact, the corrugated paperboard disclosed, with a sized medium as preferred, exhibits the best rigid when wet performance of any corrugated paperboard ever tested.

Thus, from the foregoing discussion, it should be apparent that a substantial improvement in water resistant corrugated paperboard has been achieved by the present invention. Accordingly, even though only a schematic showing of the details of the present invention have been presented for the purposes of description, it should be apparent that certain modifications and innovations could be added to the disclosure without departing from the principles of the invention set forth. Therefore, what is intended to be covered by Letters Patent is embraced in the following claims.

We claim:

1. In the process of manufacturing water resistant corrugated paperboard, consisting of at least one linerboard component having both sides thereof coated with a film of thermoplastic material, and at least one corrugating medium component having both sides thereof coated with a film of thermoplastic material, the steps of:

a. pretreating the said corrugating medium component, *before both sides thereof are coated with the film of thermoplastic material*, with an internal size treatment selected from the group consisting of 0.75–1.0% rosin with about 1.5% alum, 0.2% stearic anhydride with 0.3–0.4% alum, or 0.2% succinic anhydride with 0.3–0.4% alum to inhibit the water wicking tendencies thereof;

b. applying a direct pre-heat treatment to one side of the said coated and sized corrugating medium prior to entering the corrugating nip of a corrugating machine;

c. applying an indirect pre-heat treatment to the opposite side of the said coated and sized corrugating medium by heating at least one of the corrugating rolls of the corrugating machine;

d. applying a lubricating treatment in the form of a water spray or a water spray containing detergent to the corrugating nip of the corrugating machine;

e. applying a direct pre-heat treatment to one side of the said coated linerboard component prior to entering the bonding nip of a corrugating machine;

f. applying an indirect pre-heat treatment to the opposite side of the said coated linerboard component by heating the pressure roll of the corrugating machine;

g. applying an additional direct heating treatment at the bonding nip of the corrugating machine to render the thermoplastic film surface on one of the components tacky and bondable;

h. pressing the tacky and bondable surface of one of the components into contact with the other of said components at the bonding nip; and, i. cooling the laminate thus formed to allow the bond to set.

2. The process of claim 1 wherein the thermoplastic material is a thermoplastic polyolefin.

3. The process of claim 2 wherein the thermoplastic polyolefin is polyethylene.

4. The process of claim 3 wherein the polyethylene film thickness is in the range of from 0.75 – 1.0 mil thick.

5. The process of claim 4 wherein the direct pre-heat treatments for both the corrugated medium components and the linerboard component are in the range of 200° F.

6. The process of claim 5 wherein the temperature of at least one of the corrugating rolls is in the range of from 150°–215° F.

7. The process of claim 6 wherein the lubricating treatment is applied directly to both sides of the corrugated medium.

8. The process of claim 7 wherein the lubricating treatment is also applied to the corrugating rolls of the corrugating machine.

9. The process of claim [10] *8* wherein the additional direct heating treatment is of a temperature in excess of 450° F.

10. The process of claim 9 wherein subsequent components of the laminate are bonded to the laminate formed by pre-heating the bonding surfaces of at least two of the components to a temperature in the range of about 200° F. and applying additional direct heating treatments in excess of 450° F. at the bonding nip to render the polyethylene film surface on one of the components tacky and bondable.

* * * * *